POWER LINE CARRIER FREQUENCY TELEPHONE SYSTEM

Filed Oct. 11, 1946 2 Sheets-Sheet 1

INVENTORS: J. M. BARSTOW
A. G. LANG
BY
R. O. Covell
ATTORNEY

POWER LINE CARRIER FREQUENCY TELEPHONE SYSTEM

Filed Oct. 11, 1946 2 Sheets-Sheet 2

INVENTORS: J. M. BARSTOW
A. G. LANG
BY R. O. Covell
ATTORNEY

Patented June 6, 1950

2,510,273

UNITED STATES PATENT OFFICE 2,510,273

POWER LINE CARRIER FREQUENCY TELEPHONE SYSTEM

John M. Barstow, Mountain Lakes, N. J., and Albert G. Lang, Whitestone, N. Y., assignors to Bell Telephone Laboratories, Incorporated, New York, N. Y., a corporation of New York Application October 11, 1946, Serial No. 702,732

4 Claims. (Cl. 179—2.5)

Figure 1:
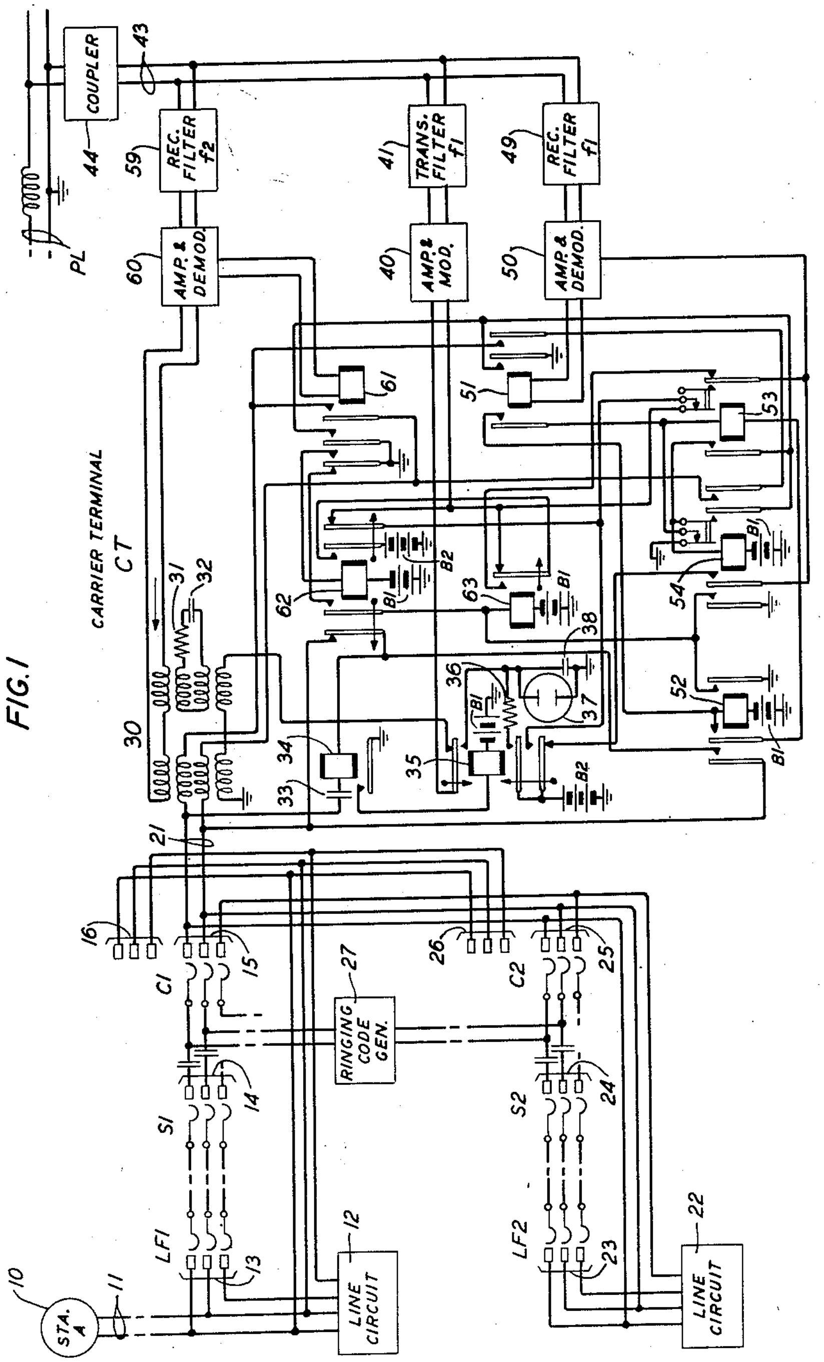

This invention relates to communication systems and particularly to telephone systems including subscriber stations arranged for carrier current operation over a power transmission line.

Objects of the invention are the provision of carrier telephone service over power transmission lines, the provision of means for recognizing reverting calls without delay and at the same time guarding against seizure of the carrier telephone line at the telephone control office, and to insure the setting of the carrier line equipment for a reverting call only when a reverting call is being made.

This invention is a telephone system comprising subscriber stations arranged for carrier current operation over a power transmission line and including means for setting the carrier terminal equipment at the telephone exchange for a reverting call without introducing a delay after each call during which no new call can be initiated over the power line.

A feature of the invention is the provision in a telephone exchange of carrier line terminal equipment connected to a power transmission line, the carrier terminal equipment including a first carrier current receiver responsive to signal and speech modulated carrier currents of a first frequency from a calling carrier station and including a second carrier current receiver responsive to carrier current of a second frequency for setting the terminal equipment for a reverting call whereby speech is transmitted directly between the calling and called stations on such a call.

Another feature of the invention is a telephone system comprising subscriber stations arranged for carrier current operation over a power transmission line and including an automatic telephone exchange provided with carrier terminal equipment arranged to permit a new call to be initiated over the power line immediately following the termination of a call to or from any of the carrier telephone stations and arranged so that release of the connection on a call to or from a carrier station is under the joint control of both the calling and called stations.

A clear and complete description of the invention will be facilitated by considering a system in which the invention and its features are embodied, such a system being represented schematically in the drawings. The invention is, however, not limited in its application to the system shown but is generally applicable to telephone systems.

The drawing which consists of two figures, represents an automatic telephone exchange serving subscriber stations some of which are arranged for carrier operation over a power transmission line.

Fig. 1 shows an automatic telephone exchange comprising a subscriber station 10, subscriber lines 11 and 21, and line circuits 12 and 22, line finder switches LF1 and LF2, selector switches S1 and S2, and connector switches C1 and C2. Fig. 1 further shows a carrier terminal equipment CT individual to the line 21 and a power transmission line PL to which the carrier terminal equipment CT is coupled by coupling means 44.

Figure 2:
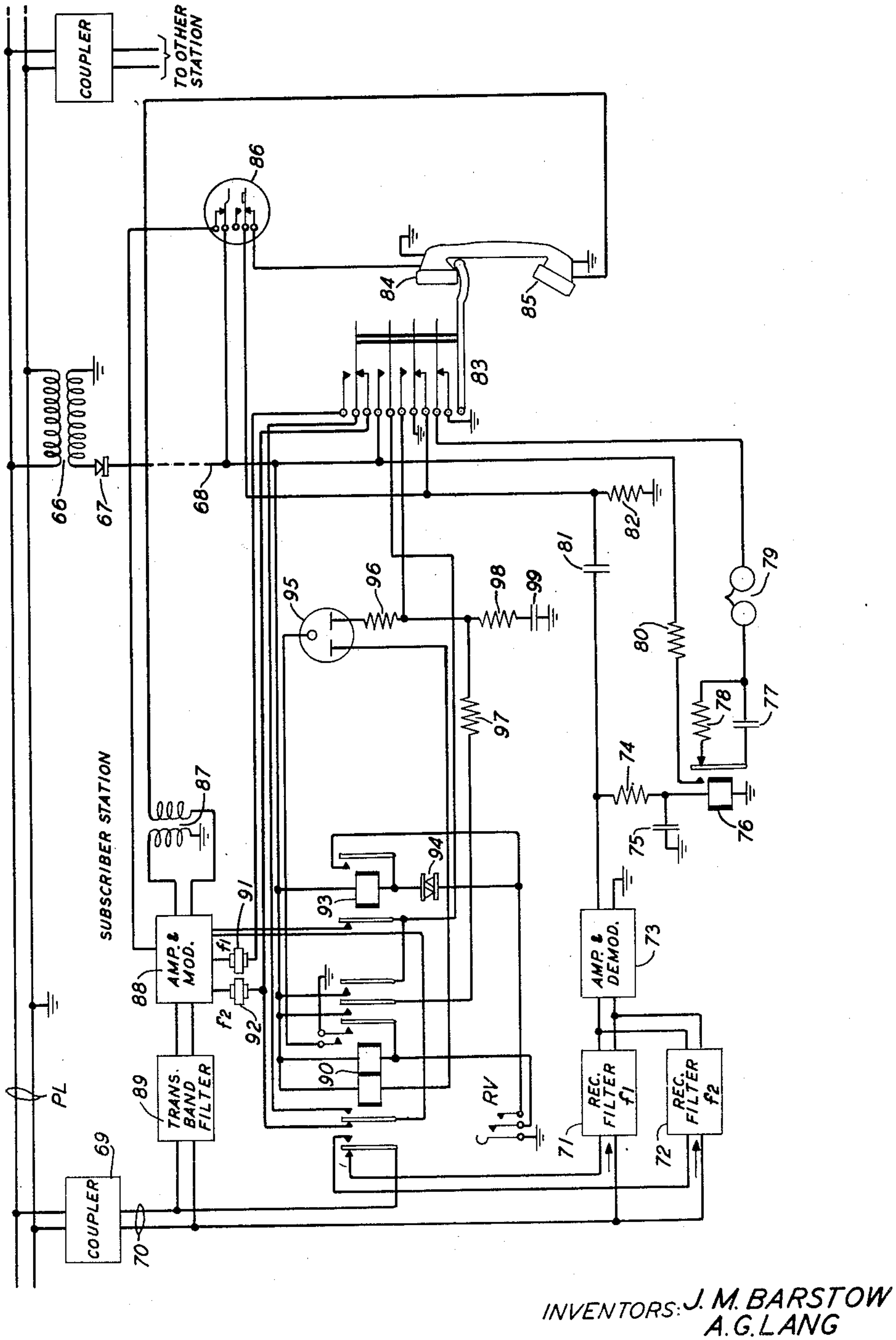

Fig. 2 shows one of a plurality of subscriber stations connected to, and arranged for carrier operation over, the power line PL.

The subscriber station 10 is of the usual type provided for use on lines terminating in an automatic central office and includes a dial or other impulse sender (not shown) for use in selectively controlling the switches through which desired connections are established. Each of the line circuits 12 and 22 consists of two relays (not shown), a line relay and a cut-off relay. The line finder, selector and connector switches may be of the two-motion step-by-step type disclosed in "Automatic Telephony" by Smith and Campbell, pages 53 to 65, inclusive, of the second edition. Each of the line finder and selector switches is represented in the drawing by a set of brushes and a single set of terminals, and each of the connector switches is represented by a set of brushes and two sets of terminals. The relays and other apparatus associated with the line finder, selector and connector switches are represented by broken lines. Reference may be had to the patent to R. L. Stokely No. 1,799,654, granted April 7, 1931, for a disclosure of a line circuit and a line finder of the step-by-step type. The ringing code generator 27 comprises a source of ringing current and means for interrupting the ringing supply leads as required to produce a plurality of different ringing codes for signaling subscriber stations. Reference may be had to the patent to Duguid No. 2,225,907, granted December 24, 1940, for disclosure of a ringing code generator and to the patent to Koechling No. 2,289,503, granted July 14, 1942, for a disclosure of a connector switch arranged for ten-party coded ringing.

The carrier terminal equipment CT comprises a hybrid coil or group of transformer windings 30 arranged to transmit signal and voice currents to and from line 21. The resistor 31 and condenser 32 constitute a network connected to the right middle pair of windings to balance the line 21. The upper pair of windings receive voice frequency currents from the amplifier-demodulator 60 and the lower pair of windings transmits voice frequency currents to the input of amplifier-modulator 40. The power line PL is one phase of a power transmission line which serves a plurality of power and light customers some of which are equipped with carrier telephone equipment as shown in Fig. 2. The power line is connected through coupling means 44, and conductors 43 to the receiving band filter 59 associated with amplifier-demodulator 60, to the receiving band filter 49 associated with amplifier-demodulator 50 and to the transmitting band filter 41 associated with amplifier-modulator 40. The amplifier-modulator 40 is arranged to transmit through filter 41, carrier current of frequency F1, modulated at a signaling frequency or modulated by voice currents incoming to hybrid coil 30 from line 21. The amplifier and demodulator 60 receives, through filter 59 from the power line PL, carrier current of frequency F2 modulated by voice and signal currents from any one of the carrier telephone stations served by the power line PL. The amplifier-demodulator 50 receives through filter 49 from power line PL, carrier current of frequency F1 from any one of the carrier telephone stations served by the power line PL on a reverting call, that is, a call between two of the carrier telephone stations connected to power line PL.

The carrier terminal equipment CT further comprises relays 34 and 35, controlled by ringing current incoming over line 21 to energize the amplifier-modulator 40 and thereby effect the transmission of carrier current impulses corresponding to the ringing code received by relay 34 from line 21. The carrier terminal equipment further comprises relays 61, 62 and 63 controlled by amplifier-demodulator 60 responsive to signals transmitted over line PL by carrier current of frequency F2; and comprises relays 51, 52, 53 and 54 controlled by amplifier-demodulator 50 responsive to signals transmitted over line PL by carrier current of frequency F1. The function of each of these relays is hereinafter described in detail.

Each of the plurality of telephone subscriber stations is similar to the station shown in detail in Fig. 2 and is connected through individual coupling means 69 to the power line PL. The station includes a receiver 84 and transmitter 85 combined in a handset which normally rests on the hook 83. A ringer 79 responds to incoming ringing signals and the dial 86 is used in controlling the automatic switches in the central office to complete desired connections. The carrier equipment at each station comprises a receiving band filter 71 tuned to the carrier frequency F1, a receiving band filter 72 tuned to the carrier frequency F2, amplifier and demodulator apparatus 73, a ringing relay 76 controlling the ringer 79, amplifier and modulator apparatus 88, a transmitting band filter 89, a frequency control relay 90, oscillator crystals 91 and 92, a transmitter cut-off relay 93 and a three-element gas-filled discharge tube 95. The power supply for the amplifier, modulator and demodulator apparatus includes the transformer 66, connected to the power line directly or through an intermediate transformer, and a rectifier 67. Other transformer windings (not shown) are provided for supplying the filaments of vacuum tubes and whatever operating potentials are required. A key RV is provided for use in making reverting calls. Each of the other carrier telephone stations connected to power line PL is similar to the station which is shown in detail.

The carrier terminal equipment CT, power line PL, and the carrier telephone stations of Fig. 2 constitute a power line carrier system similar generally to the system disclosed in the copending application of R. C. Edson and J. W. Emling, Serial No. 653,254, filed March 9, 1946, Patent No. 2,481,915, granted September 13, 1949, to which application reference may be had for discusion of the carrier frequencies suitable for use in such systems and for the disclosure of details of the coupling means between the power line and the carrier equipment CT and carrier telephone stations.

*Call from station 10 to carrier telephone station*

Assume that a call is initiated at station 10, that the line 11 is connected by a line finder LF1 to a selector S1, that the selector S1 is selectively controlled by dial impulses from station 10 to select a group of trunks and an idle trunk therein associated with the connector C1, and that the connector C1 is selectively controlled by dial impulses from station 10 to select the line 21. Assume further that the line 21 is idle when tested by the connector C1 and that a ringing code is selected responsive to dial impulses from station A and that this ringing code is transmitted through the brushes of connector C1 over the conductors of line 21, through condenser 33, the winding of ringing relay 34 and the left back contact of relay 62. Relay 34 is operatively energized during each ringing interval of the ringing code, and the operation of relay 34 closes a circuit for operating relay 35. The operation of relay 35 opens the normally closed connection between the lower windings of hybrid coil 30 and amplifier-modulator 40 and connects the positive pole of battery B2 through resistor 36 to energize the amplifier-modulator 40 and thereby transmit carrier current of frequency F1 through filter 41, conductors 43, coupler 44, over power line PL, to each of the carrier telephone stations served by the power line PL. The carrier current thus transmitted is modulated at a 16-cycle rate by breakdown of discharge tube 37 every time condenser 38 is charged through resistor 36 to the breakdown potential, the capacity of condenser 38 and the resistance of resistor 36 being such that the tube discharges 16 times per second.

At each of the carrier telephone stations, the 16-cycle modulated carrier current of frequency F1 incoming over power line PL is transmitted through a coupler 69, conductors 70, and a back contact of relay 90 and through receiving filter 71 to the amplifier-demodulator 73. The output conductor of demodulator 73 is connected through resistor 74 to the winding of relay 76. A condenser 75 connected in parallel with the winding of relay 76 renders this relay somewhat slow in operating so as to tend to prevent its operation responsive to interference currents such as static. The output conductor of demodulator 73 is further connected through the condenser 81 and the off-normal contact of dial 86 to telephone receiver 84 in parallel with resistor 82. While the telephone handset is in normal position on hook 83, the receiver 84 and resistor 82 are short-circuited at a back contact of springs controlled by hook 83. The operation of relay 76, responsive to ringing code impulses of carrier current of frequency F1, closes a circuit from the lower winding of transformer 66, through rectifier 67, conductor 68, resistor 80, front contact of relay 76, condenser 77, windings of ringer 79, to ground at a back contact of springs controlled by hook 83. The windings of ringer 79 are thereby energized while condenser 77 is charging. Since the incoming carrier current of frequency F1 is modulated at 16 cycles, relay 76 is alternately operated and released at a 16-cycle rate during each ringing interval of the ringing code. Each time relay 76 releases, condenser 77 discharges through resistor 78; and each time relay 76 reoperates, condenser 77 is charged through ringer 79. Thus the ringer at each of the carrier telephone stations is actuated in accordance with the ringing code of the particular station which is being called.

When the handset is removed from the hook 83 at the called station, the circuit through ringer 79 is opened, the short-circuit across the receiver 84 is opened and a positive operating potential is supplied to the amplifier-modulator 88, this supply path being traced from conductor 68, through a front contact of springs controlled by hook 83 and through the back contact of relay 93. The amplifier-modulator 88 is thereby energized and, with the oscillator crystal 92 operatively connected through the inner left back contact of relay 90 in the oscillator circuit of the modulator, carrier current of frequency F2 is generated and transmitted through the transmitting band filter 89, conductors 70, and coupler 69 to the power line PL, and over the power line PL to each of the other carrier stations and also to the carrier terminal equipment CT. The carrier current of frequency F2 does not reach the demodulator 73 at each of the other carrier stations because the input circuit of filter 72 of each station is open as long as the handset is in normal position on hook 83. The carrier current of frequency F2, transmitted over line PL to the carrier terminal equipment CT, passes through coupler 44, conductors 43 and receiving band filter 59 to the input circuit of amplifier-demodulator 60, and the rectified carrier current output effects the energization of relay 61. The operation of relay 61 closes a circuit for operating slow-to-release relay 62, and closes a direct current path through the left middle pair of windings of hybrid coil 30 across line 21 thereby tripping the ringing in the connector C1. The opening of the ringing circuit and closing of the talking connection through connector C1 is effected in the usual and well-known manner. The operation of relay 62 opens the circuit through the winding of relay 34 so that relays 34 and 35 release, if operated. The operation of relay 62 connects the positive pole of battery B2 through a front contact of relay 62 and a back contact of relay 63 to the amplifier-modulator 40; and, with relay 35 released, the lower pair of windings of hybrid coil 30 are connected to the input of amplifier-modulator 40, whereby carrier current of frequency F1 is modulated by voice currents from line 21 and the modulated carrier current is transmitted through filter 41, over power line PL, through filter 71 to the amplifier-demodulator 73; operating relay 76, and at the called station, at which the handset has been removed to answer the call, the output of demodulator 73 is transmitted to the receiver 84. Voice current from the transmitter 85 of the handset of the called station is transmitted through coil 87 to the input circuit of amplifier-modulator 88, therein to modulate the carrier current of frequency F2 which is being transmitted over the power line. The voice modulated carrier current of frequency F2 transmitted over the power line passes through filter 59 to demodulator 60 and the voice current output is transmitted through hybrid coil 30 over line 21, through the connector, selector and line finder switches over line 11 to the calling station.

When the handset is replaced on hook 83 at the called station, receiver 84 is again short-circuited and the amplifier-modulator 88 is de-energized, causing the successive release of relays 61 and 62 of the carrier terminal equipment CT. The release of relay 61 opens the bridge across line 21, thereby releasing the answering supervisory relay (not shown) in the connector C1. The release of relay 62 disconnects battery B2 from amplifier-modulator 40 so as to terminate the transmission of carrier current of frequency F1 over the power line, thereby causing the release of relay 76 at each of the carrier stations. When the calling station releases the connection, the connector C1, selector S1 and line finder LF1 are restored to normal in usual and well-known manner.

*Call from carrier telephone station to non-carrier station*

Assume next that one of the carrier telephone stations connected to power line PL removes the handset from the receiver hook to initiate a call. The amplifier-modulator 88 is thereby energized to transmit carrier current of frequency F2 over power line PL in the manner above described, thereby causing the operation of relays 61 and 62 of carrier terminal equipment CT. The operation of relay 61 closes the bridge across line 21 whereby the line relay (not shown) of line circuit 22 is operated to start an idle line finder such as LF2 to connect with the calling line, and the line 21 is then connected through the brushes of line finder LF2 to the associated selector S2. The operation of relay 62 energizes the amplifier-modulator 40 and dial tone is transmitted in usual manner from selector S2 over line 21, through hybrid coil 30 to the input of amplifier-modulator 40; and dial tone modulated carrier current of frequency F1 is transmitted through filter 41 over power line PL to the carrier telephone stations. The carrier current of frequency F1 effects the operation of relay 76 at each of the carrier stations; and, at the calling carrier station, the dial tone is transmitted through the receiver 84 to indicate that the dialing of the number of the telephone station with which connection is desired may be started. When the calling party dials the directory number of the called station, the dial impulses modulate the carrier current of frequency F2 transmitted through filter 89 over the power line through filter 59 of carrier terminal equipment CT to the input of amplifier-modulator 60. The receiver 84 is disconnected from amplifier-demodulator 73 while the dial is off normal.

Each dial impulse transmitted from the calling station over the power line causes the release of relay 61. The release of relay 61, responsive to the first impulse of each train corresponding to a digit of the called subscriber's number, closes a circuit for operating relay 63. Relay 63 is slow-to-release and remains operated during the response of relay 61 to all of the impulses of a train. The operation of relay 63, deenergizes the amplifier-modulator 40 and energizes the amplifier-demodulator 50 to enable the operation of relay 51 in case the call being made is a reverting call. Each release of relay 61 responsive to dial impulses opens the bridge across line 21, thereby repeating the dial impulses to selectively control the operation of selector S2 and a connector C2 to extend the connection to the called line and to select the ringing code required for signaling the called station. When relay 63 releases at the end of each train of impulses received by relay 61, the amplifier-modulator 40 is reenergized and the amplifier-demodulator 50 is deenergized.

Assume first that the called station is not one of the carrier stations connected to the power line PL. When the call is answered, the connector C2 opens the ringing circuit and closes the talking circuit in usual and well-known manner. Talking currents are transmitted through hybrid coil 30 and over the power line in both directions. The connection is under the control of the calling carrier telephone station. When the handset at this station is restored to normal position on the hook 83, the amplifier-modulator 88 is deenergized causing the successive release of relays 61 and 62 of the carrier terminal equipment CT. The release of relay 61 opens the bridge across line 21 and the release of relay 62 deenergizes the amplifier-modulator 40. The opening of the bridge across line 21 causes the release of the line relay (not shown) of the connector C2 and return of the selector S2 and line finder LF2 to normal in usual manner. The connector C2 is also restored to normal in usual manner as soon as both the calling and called stations have released the connection.

*Call between carrier stations*

Assume next that the call initiated at a carrier telephone station as above described is a call to another carrier station connected to power line PL and equipped to operate with the same frequencies as shown, such a call being known as a reverting call. After the connector C2 is selectively operated to connect with the terminals 25 of line 21, it makes the usual busy test and finds the called line 21 busy; and busy tone is thereupon transmitted from the connector through the selector S2 and line finder LF2, over line 21, through hybrid coil 30, amplifier-modulator 40, filter 41, power line PL, filter 71, amplifier-demodulator 73, and condenser 81 to the telephone receiver 84 at the calling carrier station. Upon hearing the busy tone, the calling subscriber operates the non-locking key RV and holds the key in operated position while the called station is being signaled. Operation of the RV key closes a circuit through the right winding of relay 90 and a circuit through the winding of relay 93 in series with the thermistor 94. Relay 90 operates immediately but relay 93 is marginal and does not operate for a predetermined interval of time, for instance, about .1 second. When thermistor 94 is heated to the point at which the resistance is sufficiently decreased, the current through the winding of relay 93 effects the operation of relay 93. The aforementioned operation of relay 90 opens the input to filter 71, closes the input to filter 72, inserts crystal 91 in the oscillator circuit of modulator 88 in place of crystal 92 thereby to change the frequency of the carrier current transmitted through filter 89 from frequency F2 to frequency F1, closes a locking circuit through the right winding of relay 90 independent of key RV, connects the positive potential supply conductor 68 to amplifier-modulator 88 independent of the switchhook 83, connects conductor 68 through resistors 97 and 96 to the control anode of gas-filled discharge tube 95, and connects ground to the main anode of tube 95. The amplifier-modulator 88 now transmits carrier current of frequency F1 for about .1 second until relay 93 operates. When relay 93 operates, it disconnects supply conductor 68 from amplifier-modulator 88, thereby terminating the transmission of carrier current of frequency F1 therefrom.

When the frequency of the carrier current incoming over power line PL to the carrier terminal equipment CT is changed from frequency F2 to frequency F1, relay 61 releases thereby opening the bridge across line 21 and causing the operation of relay 63. The opening of the loop across line 21, tells the connector C2 to make a reverting call test to determine whether the call is a reverting call; and, if so, the line fiinder LF2 and selector S2 are restored to normal but the connector C2 remains connected to the line 21. Reference may be had to the patent to H. Hovland, No. 1,849,087, granted March 15, 1932, for disclosure of a connector arranged to make the aforementioned reverting call test. The operation of relay 63 deenergizes amplifier-modulator 40 and energizes amplifier-demodulator 50 so that the impulse of frequency F1 transmitted from the calling station responsive to the operation of the reverting call key RV causes the operation of relay 51. The operation of relay 51 causes the operation of relay 52. When relay 51 releases, at the end of the impulse of frequency F1, relay 52 is held operated and relay 53 is operated by the current in a circuit traced from battery through the winding and inner left front contact of relay 52, winding of relay 53 and back contact of relay 54. The operation of relay 52 closes a circuit for holding relay 63 operated and bridges the winding of ringing relay 34 in series with condenser 33 across line 21 so that relay 34 will respond to ringing current incoming over line 21 from connector C2. The operation of relay 53 disconnects battery B2 from amplifier-demodulator 50, opens one path for energizing amplifier-modulator 40 so that energization of amplifier-modulator 40 is under the control of relay 35, and prepares a circuit path for operating relay 54 as soon as either of relays 51 or 61 is again operated. By the time relay 34 is first operated by ringing current from connector C2, relay 62 will have released so that when relay 35 operates, the positive pole of battery B2 is connected through the outer lower front contact of relay 35 and right back contact of relay 62 to reenergize amplifier-modulator 40 and thus effect the transmission of 16-cycle modulated current of frequency F1 over power line PL to each of the carrier telephone stations connected to line PL. During the silent intervals of each ringing code cycle, during the silent intervals between cycles and after ringing is tripped, relays 34 and 35 will be deenergized, the release of relay 35 being effective to deenergize amplifier-modulator 40 and to energize amplifier-demodulator 50. When the call is answered at the called carrier telephone station, carrier current of frequency F2 will be transmitted therefrom over line PL, causing the operation of relay 61 of the carrier terminal equipment CT. The operation of relay 61 effects the reoperation of relay 62, the operation of relay 54 and the closing of the bridge across line 21 to trip the ringing in the connector C2. Relay 54 locks independent of relay 53 and the operation of relay 54 causes the release of relays 52 and 53. It is the function of relay 54 to insure the deenergization of amplifier-modulator 40 while amplifier demodulator 50 is energized by holding relay 63 operated. When the ringing stops, the calling subscriber releases the RV key whereupon relay 93 releases and amplifier-modulator 88 is reenergized to transmit carrier current of frequency F1. The carrier current of frequency F1 thus transmitted from the calling station over line PL effects the operation of relay 51 of the carrier terminal equipment CT. As long as either of relays 51 and 61 remains operated, relay 54 is held operated and the bridge across line 21 is maintained so that release of the connector C2 awaits the replacing of the receiver on the hook at both of the calling and called stations. Voice modulated carrier current of frequency F2 is transmitted from the called station over line PL to the calling station; and voice modulated carrier current of frequency F1 is transmitted from the calling station over line PL to the called station. When the receiver is placed on the hook at the called station, the amplifier-modulator thereat is deenergized causing the release of relay 61 of the carrier terminal equipment CT. When the handset is placed on the hook at the calling station, the crystal 92 is included in the oscillatory circuit of the transmitting means in place of crystal 91 to cause the transmission of carrier current of frequency F2 in place of carrier current of frequency F1. Relay 51 of carrier terminal equipment CT is released and relay 61 reoperated when the frequency of the carrier current transmitted over power line PL from the calling station is thus changed from frequency F1 to frequency F2. The replacing of the handset opens a short-circuit across resistor 98 and condenser 99; and condenser 99 is charged in a circuit from positive potential supply conductor 68, through the next to the outer right front contact of relay 90, resistor 97, resistor 98 and condenser 99 to ground. The potential across the control electrodes of gas-filled tube 95 is thus increased as condenser 99 charges for about .5 second; whereupon the tube breaks down and a circuit is closed through the left winding of relay 90 and the main discharge gap of tube 95. The left winding of relay 90 is thus energized in opposition to the right winding to cause the release of relay 90. When relay 90 releases at the calling station, the amplifier-modulator 88 thereat is deenergized, causing the release of relay 61 of carrier terminal equipment CT. With both of relays 51 and 61 released, the bridge across line 21 is opened causing the connector C2 to be restored to normal; and the holding circuit for relay 54 is opened causing the release of relays 54 and 63 in succession.

The calling subscriber may, on a reverting call, release key RV and hang up the receiver before the call has been answered at the called station. In such a case, relay 93 releases when the RV key is released and carrier current of frequency F1 is then transmitted from the calling station until the handset is restored to normal. When the handset is replaced, carrier current of frequency F2 is transmitted from the calling station for .5 second as described in the preceding paragraph. When carrier current of frequency F1 is transmitted over the power line responsive to the release of the RV key, relay 51 is not operated because at this time the amplifier-demodulator 50 is not energized. When the impulse of carrier circuit of frequency F2 is transmitted over the power line responsive to the hang-up of the receiver, relay 61 operates and then releases. The operation of relay 61 closes the bridge across line 21, causes the operation of relays 62 and 54 and the release of relays 52 and 53. The closure across line 21 trips the ringing in the connector C2, and when relay 61 releases, relays 54, 62 and 63 release. If the impulse of carrier current of frequency F2 is inoperative to trip ringing, ringing continues until the receiver is removed at one of the carrier telephone stations.

What is claimed is:

1. In a telephone system comprising subscriber lines, switching means for interconnecting calling and called subscriber lines, a power transmission line and carrier terminal equipment interconnecting one of said subscriber lines and said power line, a plurality of telephone stations connected to said power line, each of said stations comprising means for transmitting over said power line voice and signal modulated carrier current of one of two carrier frequencies, means for receiving over said power line voice and signal modulated carrier current of the other of said two carrier frequencies, and means comprising a key for changing said transmitting and receiving means so as to transmit over said power line carrier current of said other frequency and receive over said power line carrier current of said one frequency, said carrier terminal equipment comprising means for transmitting over said power line to said stations carrier current of said other frequency modulated by voice and signal currents received from said one subscriber line, normally operative means for receiving voice and signal modulated carrier current of said one frequency from said power line and for transmitting the demodulated voice currents and signals over said subscriber line, normally inoperative means for receiving over said power line carrier current signals of said other frequency, and relay means controlled by said normally operative receiving means for rendering said normally inoperative receiving means operative responsive to the termination of carrier current of said one frequency over said power line.

2. In a telephone system comprising subscriber lines, switching means for interconnecting calling and called subscriber lines, a power transmission line and carrier terminal equipment interconnecting one of said subscriber lines and said power line, a plurality of telephone stations connected to said power line, each of said stations comprising means for transmitting over said power line voice and signal modulated carrier current of a first one of two carrier frequencies, means for receiving over said power line voice and signal modulated carrier current of the other of said two carrier frequencies, and means comprising a key for changing said transmitting and receiving means so as to transmit over said power line carrier current of said other frequency and receive over said power line carrier current of said first frequency, said carrier terminal equipment comprising means for transmitting over said power line to said stations carrier current of said other frequency modulated by voice and signal currents received from said one subscriber line, normally operative means for receiving voice and signal modulated carrier current of said first frequency from said power line and for transmitting the demodulated voice currents and signals over said subscriber line, normally inoperative means for receiving over said power line carrier current signals of said other frequency, relay means controlled by said normally operative receiving means for rendering said normally inoperative receiving means operative responsive to the termination of carrier circuit of said first frequency over said power line, and relay means controlled by said normally inoperative receiving means for disabling said transmitting means, for disabling said normally inoperative receiving means and for enabling the further energization of said normally inoperative receiving means.

3. In a telephone system including subscriber lines, a power line and a plurality of subscriber stations arranged for carrier current operation over said power line, carrier terminal equipment connecting one of said subscriber lines to said power line, said equipment comprising transformer means connected to said one line for transmitting voice frequency currents to and from said one line, normally inoperative carrier current transmitting means for transmitting over said power line voice and signal modulated carrier current of one of two carrier frequencies, relay means responsive to ringing current received over said one line for energizing said transmitting means and for modulating at a desired rate the carrier current of said one carrier frequency transmitted over said power line, normally operative receiving means tuned to receive carrier current of the other of said two frequencies, means including said transformer means and said normally operative receiving means for transmitting voice frequency currents over said one line, relay means controlled by said normally operative receiving means to close a bridge across said one line, to energize said transmitting means and to disable said ringing relay means, normally inoperative receiving means tuned to receive carrier current of said one carrier frequency, relay means controlled by said normally operative receiving means for enabling said transmitting means responsive to carrier current of said other frequency incoming over said power line, for disabling said transmitting means responsive to the termination of carrier current of said other frequency over said power line, and for energizing said normally inoperative receiving means responsive to the termination of carrier current of said other frequency over said power line, relay means controlled by said normally inoperative receiving means responsive to an impulse of carrier current of said one frequency for enabling the response of said ringing relay means to ringing current thereafter incoming over said one line, thereby to reenergize said transmitting means to transmit carrier current of said first frequency modulated at said desired rate responsive to ringing current and for again deenergizing said normally inoperative receiving means at the end of said impulse, relay means controlled by said normally operative receiving means responsive to carrier current of said other frequency incoming over said power line following receipt of said impulse of carrier current of said one frequency by said normally inoperative receiving means for reclosing said bridge across said one line, for disabling said transmitting means, for maintaining the bridge across said one line and for energizing said normally inoperative receiving means and maintaining the deenergization of said transmitting means as long as carrier current is being received over said power line by either one of said receiving means.

4. In a telephone system, subscriber lines, a power line, a plurality of subscriber stations arranged for carrier current operation over said power line and carrier terminal equipment connecting one of said subscriber lines to said power line, each of said subscriber stations comprising receiving means normally tuned to receive carrier current of one of two carrier frequencies, relay and ringer means normally responsive to ringing signal modulated carrier current of said one frequency incoming over said line, a telephone receiver, a receiver hook, a set of contact springs controlled by said receiver hook including a contact normally disabling said receiver and a contact for disabling said ringer when the receiver is removed from said hook, transmitting means including oscillator means for transmitting carrier current of either one of said two frequencies, a telephone transmitter, means connecting said telephone transmitter to modulate the carrier current transmitted by said transmitting means over said power line, a dial for modulating the carrier current transmitted by said transmitting means over said power line, means for energizing said transmitting means when said receiver is removed from the receiver hook to initiate a call to transmit carrier current of one of said frequencies, a non-locking key for use on an outgoing call to another of the stations connected to said power line, a frequency changing relay controlling the frequency of said oscillator means and controlling the frequency to which said receiving means is tuned, means comprising said key for operating said relay while said receiver is removed from the receiver hook to terminate the transmission of carrier current of said one frequency and transmit carrier current of the other of said frequencies, means for deenergizing said transmitting means a predetermined interval of time after said relay operates and for maintaining the deenergization of said transmitting means until said key is released, and means for holding said relay operated after said key is released until said receiver hook is restored to normal.

JOHN M. BARSTOW.
ALBERT G. LANG.

REFERENCES CITED

The following references are of record in the file of this patent:

UNITED STATES PATENTS

| Number | Name | Date |
|---|---|---|
| 2,289,048 | Sandalls, Jr. | July 7, 1942 |
| 2,294,905 | Honaman | Sept. 8, 1942 |
| 2,408,085 | Meacham | Sept. 24, 1946 |